(12) United States Patent
Woffenden

(10) Patent No.: US 11,600,290 B2
(45) Date of Patent: Mar. 7, 2023

(54) SYSTEM AND METHOD FOR TALKING AVATAR

(71) Applicant: ROSETTA STONE, LTD., Harrisonburg, VA (US)

(72) Inventor: Carl Adrian Woffenden, Bartenheim la Chaussée (FR)

(73) Assignee: LEXIA LEARNING SYSTEMS LLC, Concord, MA (US)

(*) Notice: Subject to any disclaimer, the term of this patent is extended or adjusted under 35 U.S.C. 154(b) by 37 days.

(21) Appl. No.: 17/015,902

(22) Filed: Sep. 9, 2020

(65) Prior Publication Data

US 2021/0082452 A1    Mar. 18, 2021

Related U.S. Application Data

(60) Provisional application No. 62/914,700, filed on Oct. 14, 2019, provisional application No. 62/901,595, filed on Sep. 17, 2019.

(51) Int. Cl.
*G10L 21/10* (2013.01)
*G10L 19/00* (2013.01)
(Continued)

(52) U.S. Cl.
CPC .............. *G10L 21/10* (2013.01); *G06T 13/00* (2013.01); *G09B 5/065* (2013.01); *G09B 19/06* (2013.01); *G10L 19/00* (2013.01)

(58) Field of Classification Search
CPC ... G10L 21/10; G10L 19/00; G10L 2021/105; G06T 13/00; G09B 5/065; G09B 19/06
See application file for complete search history.

(56) References Cited

U.S. PATENT DOCUMENTS 6,332,123 B1 * 12/2001 Kaneko ................. G06T 13/205
                                                704/E21.02
10,770,092 B1 * 9/2020 Adams .................... G10L 21/10
(Continued)

FOREIGN PATENT DOCUMENTS

EP             0668700 A2 *  2/1995  ............. G10L 13/06
WO    WO-2011143107 A1 * 11/2011  ............. G10L 13/07

OTHER PUBLICATIONS

An International Search Report and Written Opinion of the International Searching Authority dated Dec. 18, 2020 in connections with International patent application No. PCT/US2020/049941.

*Primary Examiner* — Jacinta M Crawford
*Assistant Examiner* — Donna J. Ricks
(74) *Attorney, Agent, or Firm* — Baker & Mckenzie

(57) ABSTRACT

Aspects of this disclosure provide techniques for generating a viseme and corresponding intensity pair. In some embodiments, the method includes generating, by a server, a viseme and corresponding intensity pair based at least on one of a clean vocal track or corresponding transcription. The method may include generating, by the server, a compressed audio file based at least on one of the viseme, the corresponding intensity, music, or visual offset. The method may further include generating, by the server or a client end application, a buffer of raw pulse-code modulated (PCM) data based on decoding at least a part of the compressed audio file, where the viseme is scheduled to align with a corresponding phoneme.

20 Claims, 10 Drawing Sheets

(51) Int. Cl.
*G09B 19/06* (2006.01)
*G09B 5/06* (2006.01)
*G06T 13/00* (2011.01)

(56) References Cited

U.S. PATENT DOCUMENTS

| | | | |
|---|---|---|---|
| 2006/0072399 A1* | 4/2006 | Fujimoto | H04N 9/8042 386/E9.017 |
| 2012/0323581 A1* | 12/2012 | Strietzel | G06T 19/20 704/276 |
| 2019/0147838 A1 | 5/2019 | Serletic, II et al. | |
| 2019/0279410 A1* | 9/2019 | Orvalho | G06F 3/012 |
| 2020/0380998 A1* | 12/2020 | Mindlin | G10L 19/008 |

* cited by examiner

| WIDA: | Entering | Beginning | Developing | Expanding | Bridging | Reaching |
|---|---|---|---|---|---|---|
| Level 1 | x | | | | | |
| Level 2 | x | | | | | |
| Level 3 | | x | | | | |
| Level 4 | | x | | | | |
| Level 5 | | | x | | | |
| Level 6 | | | x | | | |
| Level 7 | | | | x | | |
| Level 8 | | | | x | | |
| Level 9 | | | | | x | |
| Level 10 | | | | | x | |
| Level 11 | | | | | | x |
| Level 12 | | | | | | x |
| Level 13 | | | | | | |
| Level 14 | | | | | | |
| Level 15 | | | | | | |
| Level 16 | | | | | | |
| Level 17 | | | | | | |
| Level 18 | | | | | | |
| Level 19 | | | | | | |
| Level 20 | | | | | | |
| Level 21 | | | | | | |

WIDA K-2

FIG. 4

SYSTEM AND METHOD FOR TALKING AVATAR

CROSS-REFERENCE TO RELATED PATENT APPLICATION

This patent application claims priority to and the benefit of U.S. Provisional Patent Application No. 62/901,595 filed on Sep. 17, 2019 and entitled "Language Education and Learning System" and U.S. Provisional Patent Application No. 62/914,700 filed on Oct. 14, 2019 and entitled "System and Method for Talking Avatar," both of which are incorporated by reference in their entireties.

BACKGROUND

Traditional methods for learning a language, in particular a foreign language, are typically not enjoyable for students. Students may spend most of the time learning rules of grammar and syntax and memorizing words in the target language (the language being learned). The students are generally not exposed to correct pronunciation except for a recording of the target language. This type of approach generally does not enable the language learner to converse fluently in the target language.

SUMMARY

According to one aspect, the invention is directed to a method for generating a viseme and corresponding intensity pair, wherein the method may include the steps of generating, by a server, a viseme and corresponding intensity pair based at least on one of a clean vocal track or corresponding transcription; generating, by the server, a compressed audio file based at least on one of the viseme, the corresponding intensity, music, or visual offset; and generating, by the server or a client end application, a buffer of raw pulse-code modulated (PCM) data based on decoding at least a part of the compressed audio file, wherein the viseme is scheduled to align with a corresponding phoneme.

According to another aspect, the invention is directed to another method for generating a viseme and corresponding intensity pair, wherein the method may include the steps of generating, by a server, a viseme and corresponding intensity pair based at least on one of a clean vocal track or corresponding transcription; generating, by the server, a compressed audio file based at least on one of the viseme, the corresponding intensity, music, or visual offset; and inserting, by the server or a client end application, a viseme generator based at least on one of a processing buffer or the compressed audio file, wherein the viseme is scheduled to align with a corresponding phoneme.

According to another aspect, the invention is directed to a system for generating a viseme and corresponding intensity pair, wherein the system may include a processor and a non-transitory computer readable storage medium storing programming for execution by the processor. The programming may include instructions to generate a viseme and corresponding intensity pair based at least on one of a clean vocal track or corresponding transcription; generate a compressed audio file based at least on one of the viseme, the corresponding intensity, music, or visual offset; and generate a buffer of raw pulse-code modulated (PCM) data based on decoding at least a part of the compressed audio file, wherein the viseme is scheduled to align with a corresponding phoneme.

BRIEF DESCRIPTION OF THE DRAWINGS

The foregoing brief description and further objects, features and advantages of the present invention will be understood more completely from the following detailed description of a presciently preferred, but nonetheless illustrative, embodiment in accordance with the present invention, with a reference being had to the accompanying drawings, in which:

FIG. 4 is another diagram of categorization of student's levels of language proficiency, according to one implementation of this disclosure;

DETAILED DESCRIPTION

Quite often, language learning applications may display animation or talking characters to help a language learner emulate mouth shapes when pronouncing a target language. But existing language learning applications might not take a learner's mother tongue, home language, or heritage language into consideration, at least not as an asset. Existing language learning applications might not provide sufficient speaking and listening interaction between the learner and the language learning application. The mouth shapes or facial expression and acoustic pronunciation of the talking characters might not be synchronized in existing language learning methods and systems. In other words, visemes and phonemes might not be synchronized in existing language learning applications.

A viseme is a generic facial image or facial expression that can be used to describe a particular sound. The viseme may be considered the visual equivalent of a unit of sound in spoken language. The viseme may be one of several speech sounds that look the same, e.g., for lip reading. Visemes and phonemes might not share a one-to-one correspondence, and often several phonemes may correspond to a single viseme. Synchronized mouth shapes or facial expression and acoustic pronunciation of the talking characters may help the learner to learn to properly pronounce the target language.

It may be desirable to develop a language learning method and system that cherishes a heritage language, and improves the speaking and listening interaction between the system and the learner, and the synchronization between the visemes and phonemes of the talking characters. This may allow the user to better utilize the language learning application, e.g., in learning a second language. The present disclosure is directed to an improved language learning method and system with personalized interactive functionality and more accurate synchronization between the visemes and phonemes of animation.

An exemplary benefit or advantage of the present disclosure is a personalized language learning application with better interactive functionality and/or better tolerance for accents. The improved language learning application may provide better viseme source generation capabilities and/or accurate low-latency in viseme events. For example, with the techniques in the present disclosure, the viseme events arrive within a "frame" which may be approximately every 1/60th of a second. Another exemplary benefit or advantage of the present disclosure is an improved language learning application with better quality control of the talking characters.

Figure 1:
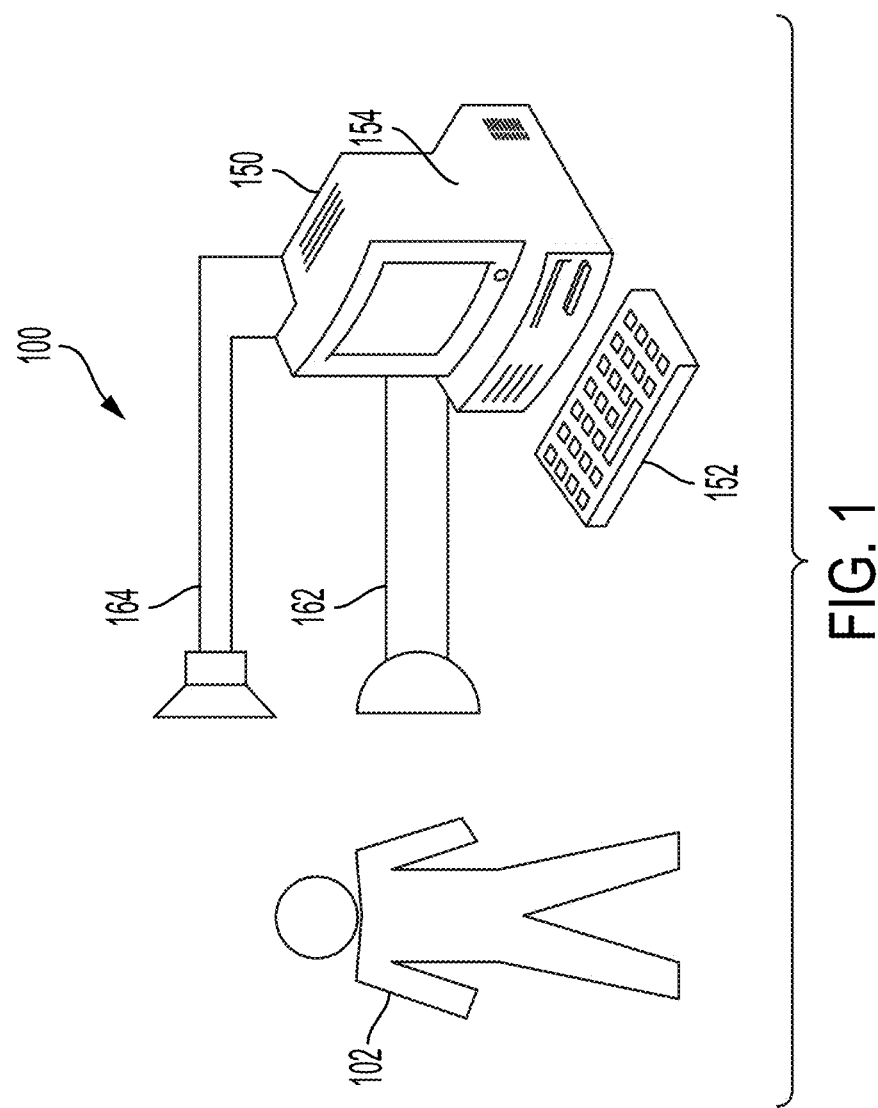
FIG. 1 is a diagram of a language instruction system including a computer system and audio equipment embodying the present disclosure.

FIG. 1 is a schematic block diagram of a language instruction system 100 including a computer system 150 and audio equipment suitable for teaching a target language to student 102 in accordance with an embodiment of the present invention. Language instruction system 100 may interact with one language student 102, or with a plurality of students. Language instruction system 100 may include computer system 150, which may include keyboard 152 (which may have a mouse or other graphical user-input mechanism embedded therein), display 154, microphone 162, and/or speaker 164. Language instruction system 100 may further include additional suitable equipment such as analog-to-digital converters and digital-to-analog converters to interface between the audible sounds received at microphone 162, and played from speaker 164, and the digital data indicative of sound stored and processed within computer system 150.

The computer 150 and audio equipment shown in FIG. 1 are intended to illustrate one way of implementing an embodiment of the present disclosure. Specifically, computer 150 (which may also referred to as "computer system 150") and audio devices 162, 164 preferably enable two-way audio-visual communication between the student 102 (which may be a single person) and the computer system 150.

In one embodiment, software for enabling computer system 150 to interact with student 102 may be stored on volatile or non-volatile memory within computer 150. However, in other embodiments, software and/or data for enabling computer 150 may be accessed over a local area network (LAN) and/or a wide area network (WAN), such as the Internet. In some embodiments, a combination of the foregoing approaches may be employed. Moreover, embodiments of the present disclosure may be implemented using equipment other than that shown in FIG. 1. Computers embodied in various modern devices, both portable and fixed, may be employed, including but not limited to user equipment (UE), personal computers (PCs), Personal Digital Assistants (PDAs), cell phones, smart phones, tablets, wearable communications devices (e.g., smartwatches), game consoles, smart televisions (TVs), among other devices with the capability to access a telecommunications network.

Figure 2:
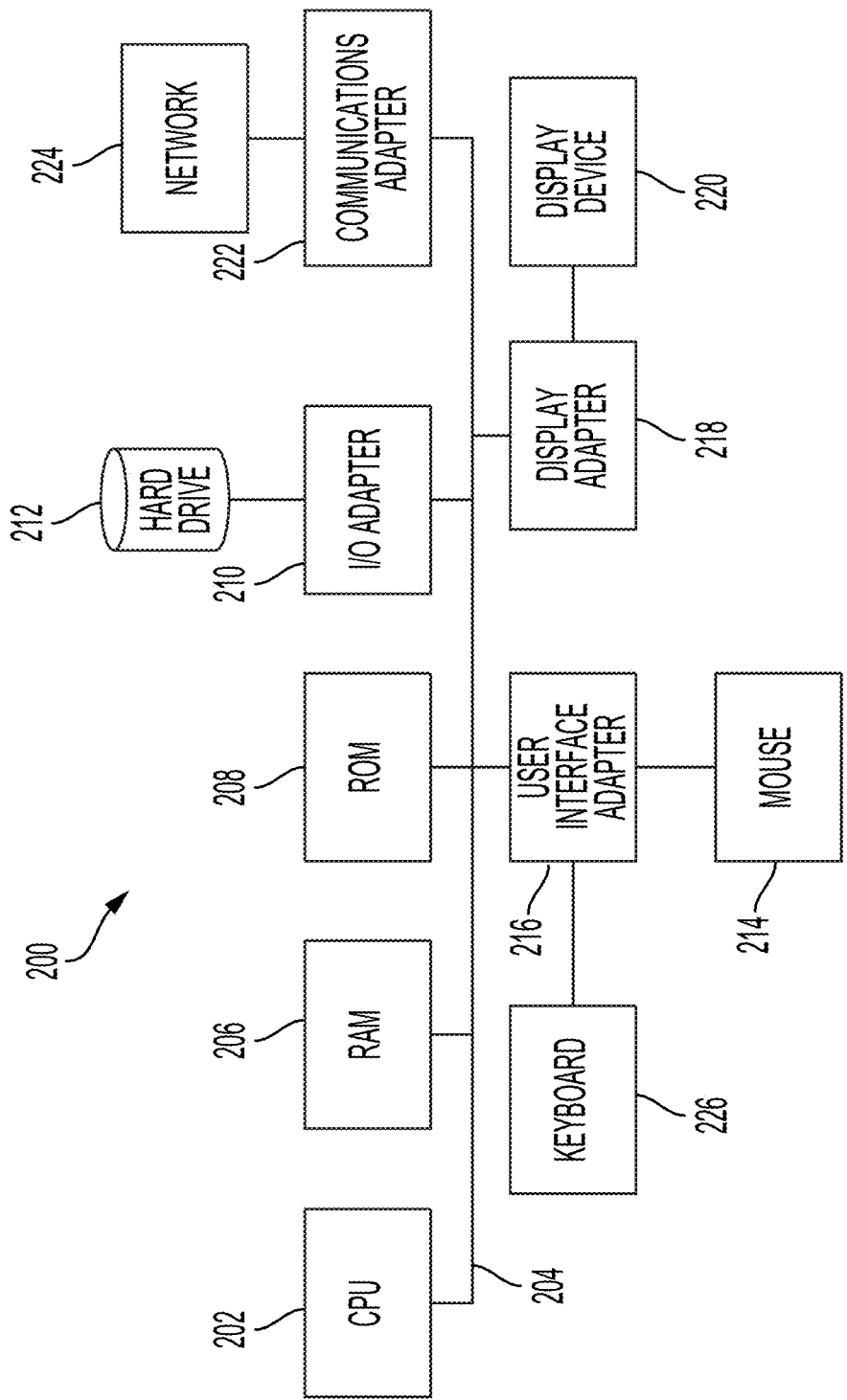
FIG. 2 is a block diagram of a processing system for performing methods described herein, according to one implementation of this disclosure.

FIG. 2 depicts an example computing system 200 in accordance with some embodiments that may be used for implementing a language learning application as described above. Central processing unit (CPU) 202 may be coupled to bus 204. In addition, bus 204 may be coupled to random access memory (RAM) 206, read only memory (ROM) 208, input/output (I/O) adapter 210, communications adapter 222, user interface adapter 216, and display adapter 218.

In an embodiment, RAM 206 and/or ROM 208 may hold user data, system data, and/or programs. I/O adapter 210 may connect storage devices, such as hard drive 212, a CD-ROM (not shown), or other mass storage device to computing system 200. Communications adapter 222 may couple computing system 200 to a local, wide-area, or global network 224. Communications adapter 222 may communicatively couple computing system 200 to a wireless or wired telecommunications network. User interface adapter 216 may couple user input devices, such as keyboard 226, scanner 228 and/or pointing device 214, to computing system 200. Moreover, display adapter 218 may be driven by CPU 202 to control the display on display device 220. CPU 202 may be any general purpose CPU.

Figure 3:
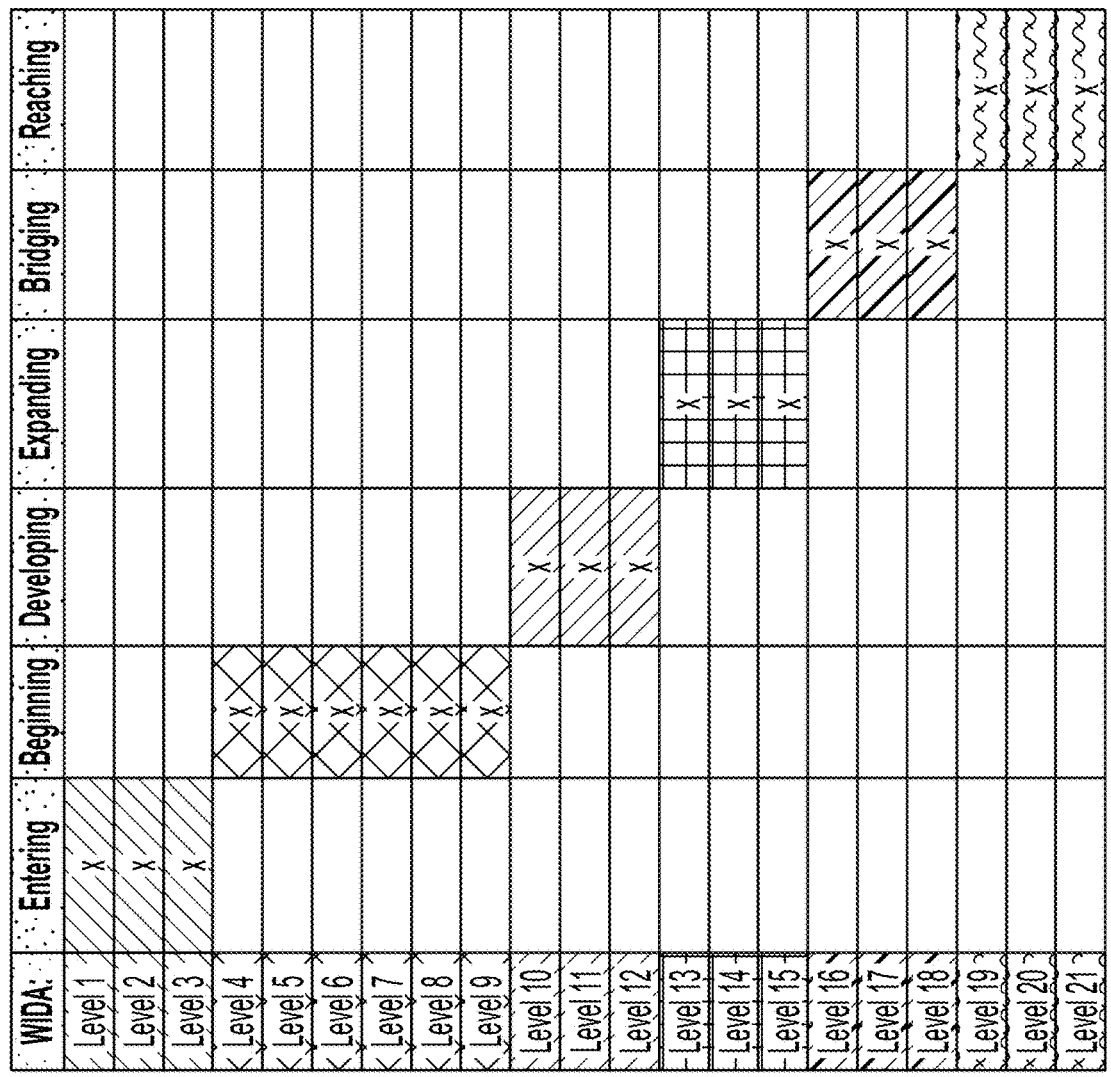
FIG. 3 is a diagram of categorization of students' levels of language proficiency, according to one implementation of this disclosure.

FIGS. 3 and 4 depict example diagrams of categorization of a student's language proficiency levels in accordance with some embodiments that may be used for implementing a language learning application as described above. As shown in FIG. 3, a student may be placed into a band. In an embodiment, a student may only start at the beginning of a band. For example, a student may only start at the beginning of a band, which starts with level 1 and under an "entering" phase. FIG. 4 illustrates a different allocation of bands regarding different levels of language proficiency and phase of the language development. By starting a student or a learner at the beginning of a band, better learning experience and result may be achieved.

Figure 5A:
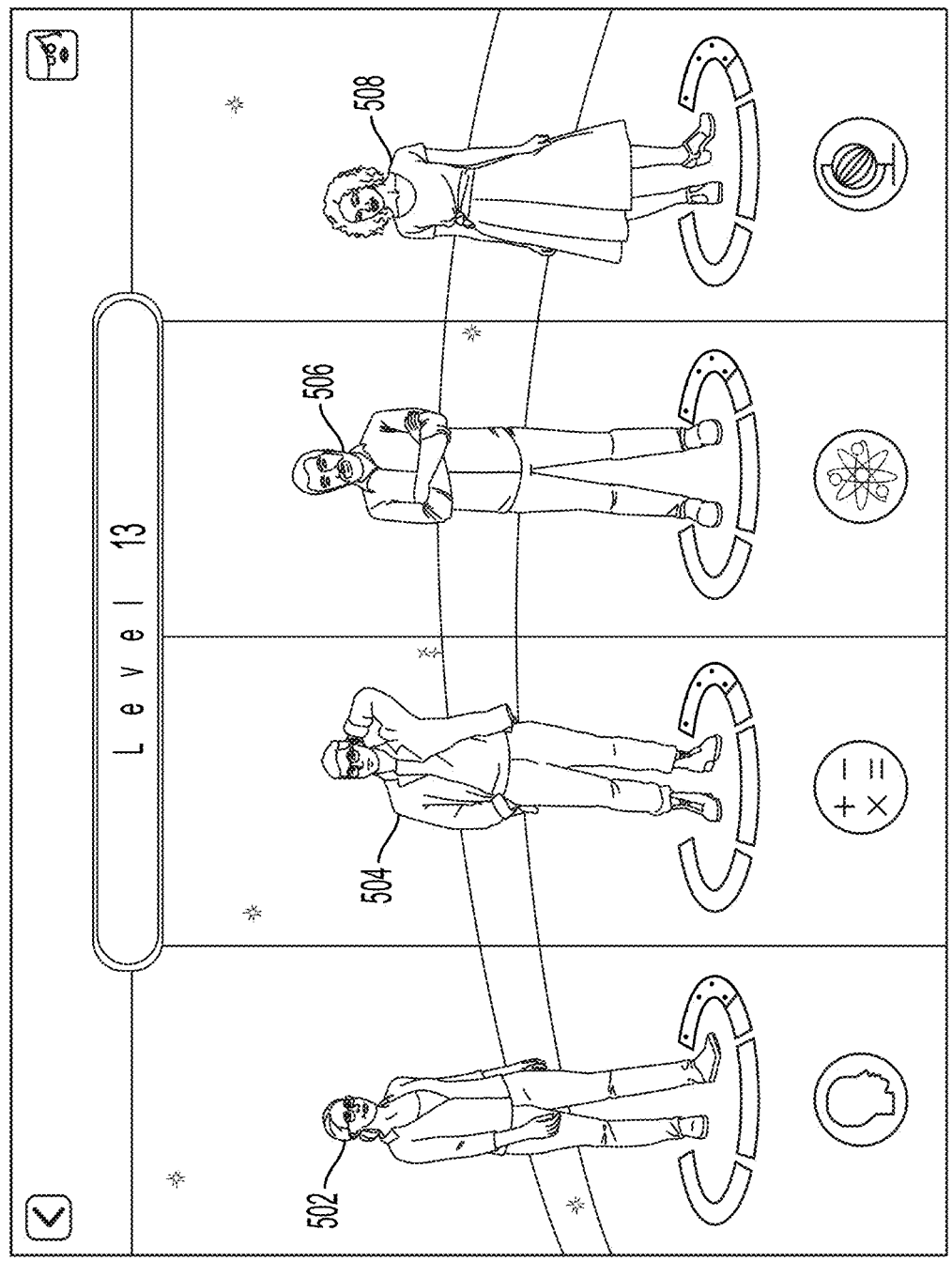
FIGS. 5A and 5B are diagrams of talking characters, according to one implementation of this disclosure.
Figure 5B:
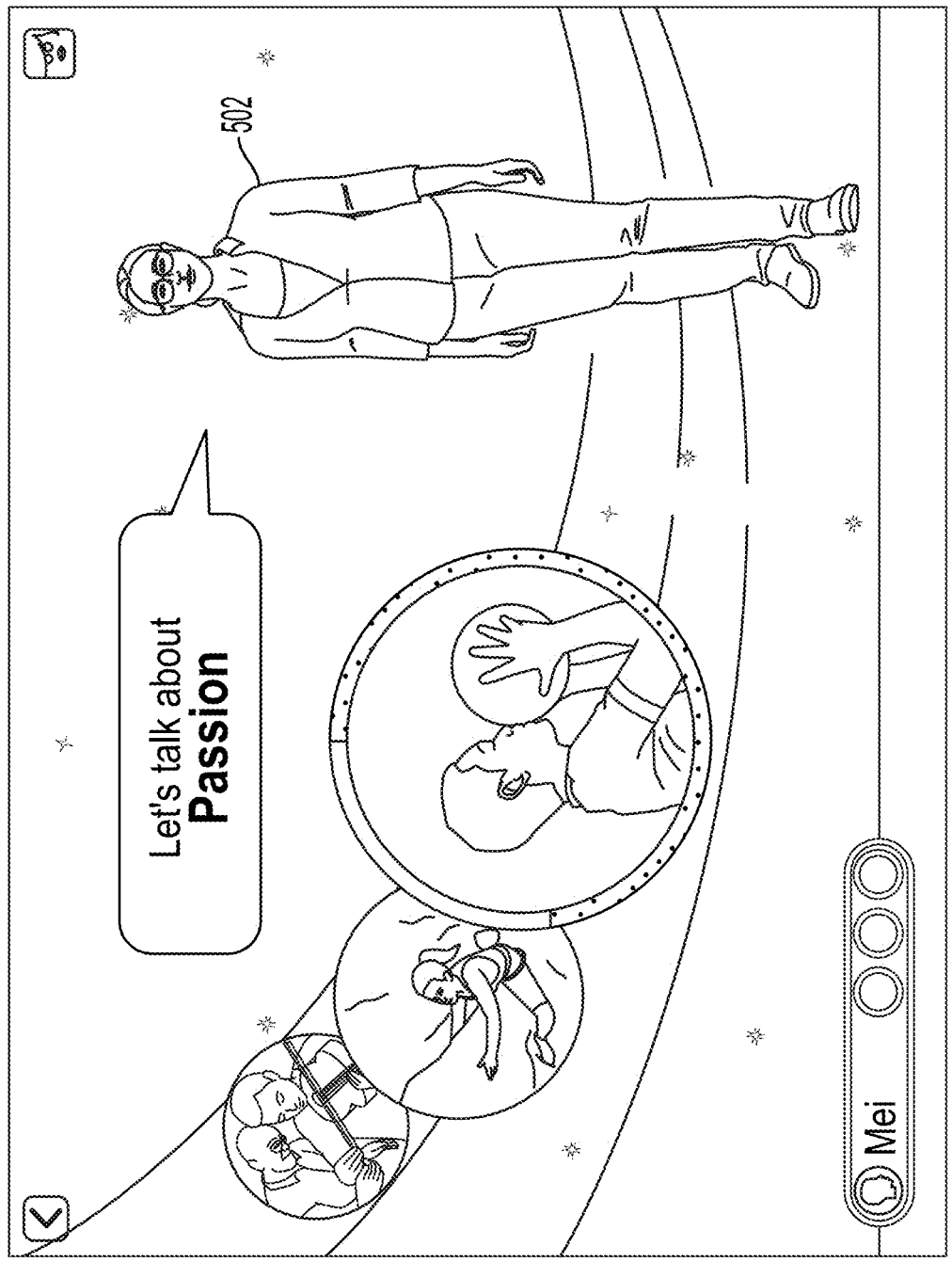

FIGS. 5A and 5B depict a diagram of example animation or talking characters for performing methods described herein. A student may be placed at a level according to their level of proficiency (LP) as described above. As shown, one or more talking characters may greet the student at the beginning of or during a learning session. The facial expressions of the talking characters may change according to synchronized visemes, similar to the visemes people may have when speaking. For example, four characters 502, 504, 506, and 508 greet the student as shown in FIG. 5A. At least one of the four characters 502, 504, 506, and 508 may be bilingual. In other words, at least one of the four characters 502-508 may have a different heritage language, home language, or mother tongue other than a target language that is being learned by the student. At least one of the bilingual character(s) may have some accent speaking the target language. This way, when the learner also has an accent speaking the target language, he or she may feel more comfortable or relaxed using the language learning application.

Each character may also be a subject expert, e.g., Math, Science, Social Studies, or another subject that is taught at a school. A student may choose the order to speak to each of the characters, and the chosen character may propose a topic to discuss with the student. In this example, the student chose the character 502, and the chosen character 502 proposed a topic, passion, to discuss with the student as shown in FIG. 5B. Real-time conversations may be conducted between the chosen talking character and the student. The chosen character 502 may further propose a sub-topic under the topic passion, e.g., violin, rock climbing, soccer. In an embodiment, the student may need to talk to all characters eventually, e.g., in a learning session. In another embodiment, the student may need to talk to some of all characters in a learning session.

Figure 6:
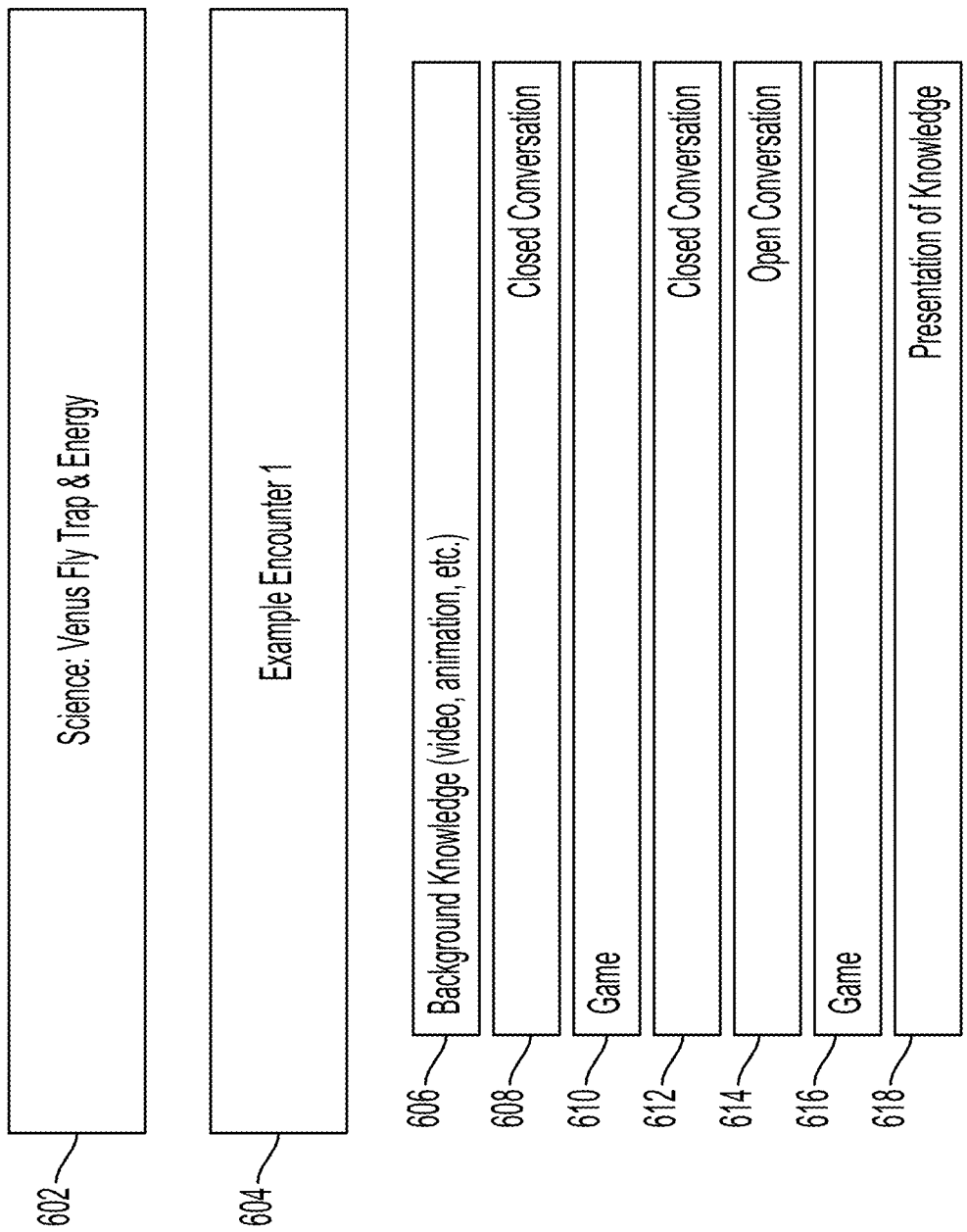
FIG. 6 is a diagram of an encounter with a talking character including listening games, according to one implementation of this disclosure.

FIG. 6 depicts an example schematic diagram of an encounter 604 with listening games for performing methods described herein. The listening game may be modeled based on one or more language development standards such as language development standards for English. In this example, the encounter is under the science subject, and the topic is about Venus flytrap and energy 602. The example encounter 604 may include a background knowledge part 606, where background knowledge on the topic may be shown, e.g., with a video, an animation, etc. The background knowledge part 606 may be followed by a closed conversation 608 between the learner and the corresponding character of the science subject, and then a first game 610 such as a listening game. Then the application may provide a second closed conversation 612 and an open conversation 614, followed by a second game 616 such as a listening game. A closed conversation may be a conversation including questions that can be answered with yes or no answers while an open conversation may be a conversation including questions which might not be answered with simple yes or no answers. And the encounter may close with a presentation of knowledge part 618.

Figure 7:
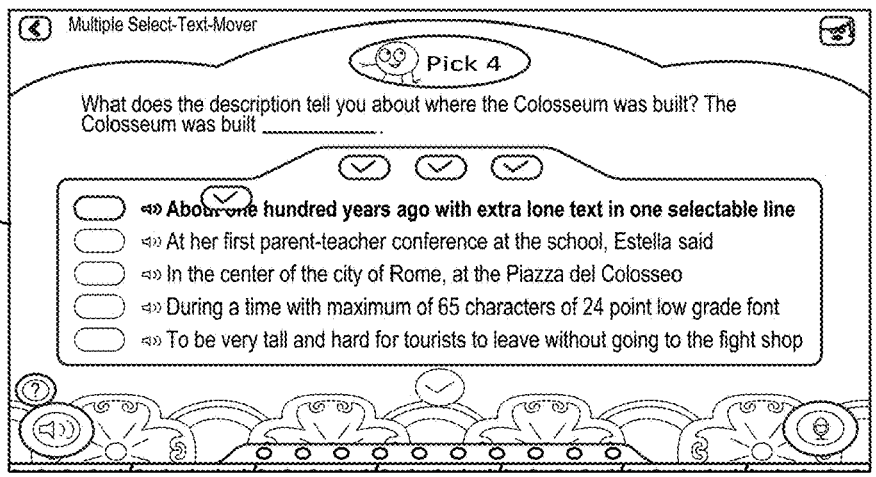
FIG. 7 is a diagram of another encounter with a talking character, according to one implementation of this disclosure.
Figure 7:
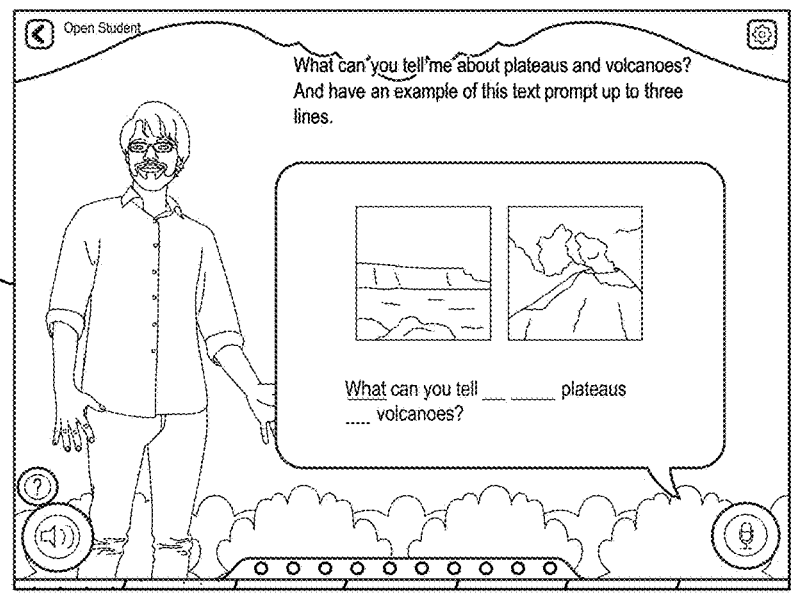
Figure 7:
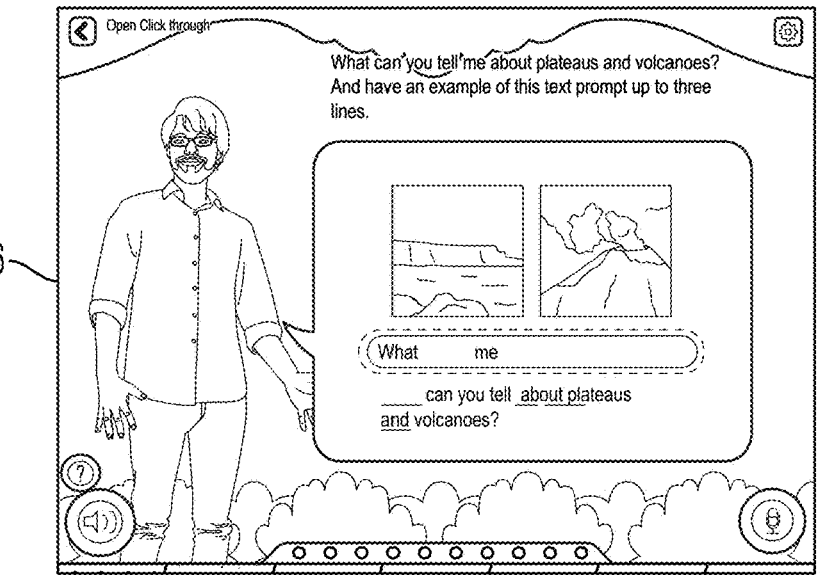

FIG. 7 depicts another example diagram of an encounter for performing methods described herein. In this example, a first listening game is provided on the topic of the Colosseum, and a multiple choice problem 702 is displayed to the student. The problem 702 and the corresponding answer(s) may be played back by pressing a playback icon. A second listening game may be played, and a second problem 704 may be displayed to the student with pictures representing new words of elements in the second problem 704. In an embodiment, other learning point(s) of the target language such as grammar point(s), may be displayed or pronounced to the student. Here, an incomplete question is displayed to the student to fill out blank spaces in the question. The character may pronounce the answers if the student presses a corresponding button or speaks. The answers may be visually displayed as in the block 706.

Figure 8:
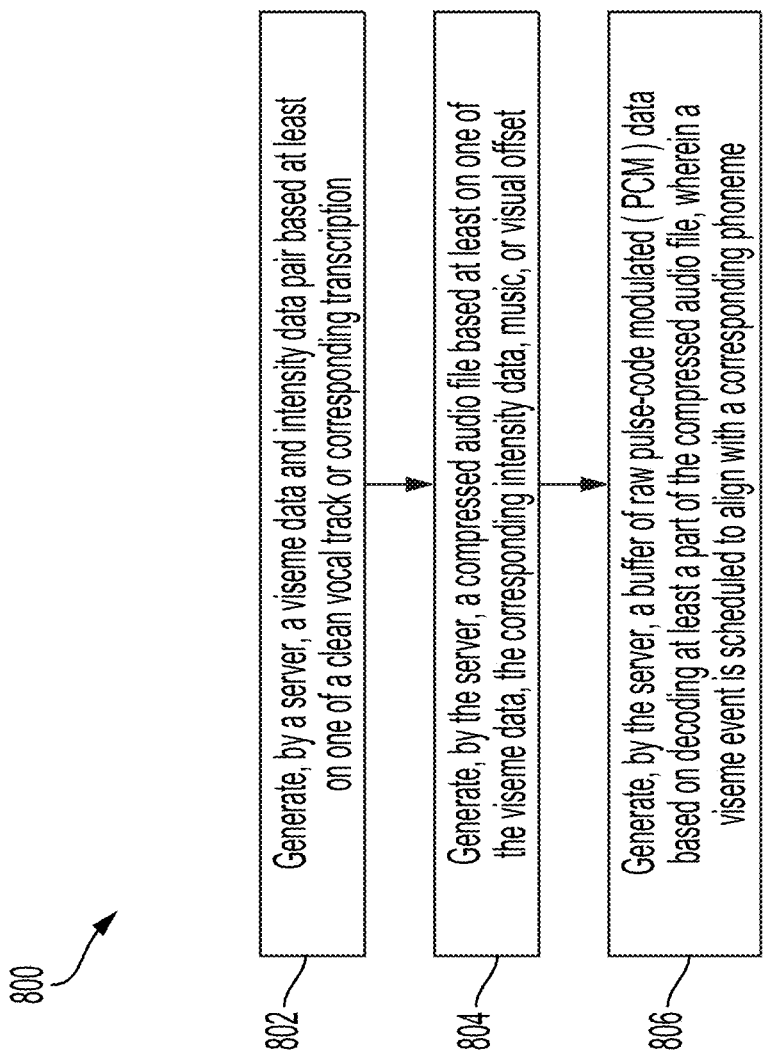
FIG. 8 is a flowchart of a method for generating a viseme and corresponding intensity pair according to one implementation of this disclosure.

With reference to FIG. 8, an example method 800 for generating a viseme and corresponding intensity pair is provided. It is to be appreciated that these can be considered as "events" from a technical perspective as an "event" is something that is raised at a point in time. The method 800 may be used in the language learning application, e.g., implemented by the computer system 150 or the computing system 200 such as a server or a user equipment (UE). The method 800 may begin with an encoding step 802 by generating a viseme and corresponding intensity pair based at least on one of a clean vocal track or corresponding transcription. The clean vocal track might not include incidental music, other background audio, or effects. In an embodiment, a viseme for the mouth shape of a talking character, such as the characters 502, 504, 506, 508, has a corresponding intensity. The viseme and intensity may be used as a pair for the talking character. For example, the mouth in an O shape may be 25% open when making a quiet sound. In an embodiment, a sound file of the clean vocal track may be used with human transcription to generate the viseme and/or corresponding intensity pairs. The transcript may be optional but has been found to improve the end quality of the language learning system and method. The generated viseme and intensity pairs may be stored in an intermediary file with the precise timing when the viseme or intensity occurred.

The method 800 may include a step 804 for generating a compressed audio file based at least on one of the viseme, the corresponding intensity, music, or visual offset. Within this generating compressed audio file step 804, the final audio mix (e.g., including music) may then be combined with the viseme generated in the previous step 802 and visual offset into one compressed audio file.

The visual offset may be used to delay or advance where the visemes occur. For example, for a cartoon character, where the mouth switches rapidly between shapes, the visual offset may be used to delay the viseme since there might be no blending between mouth shapes. For a more realistic character the visual offset may be used to advance the viseme to compensate for longer blending between mouth shapes. The compressed audio file may be stored in or converted to different audio formats. For example, the compressed audio file may be a compressed Opus format file with the viseme data embedded in a custom "tag." The Opus format is a lossy audio coding or audio compression format designed to efficiently code speech or audio in general in a single format while maintaining low-latency for real-time interactive communication and low complexity for low-end embedded processors. Alternatively, the audio mix may be kept in a separate file from the viseme data and visual offset. This generating compressed audio file step 804 may be an off-line process with the resulting compressed audio being used on client hardware.

The method 800 may further include a step 806 for generating a buffer of raw pulse-code modulation (PCM) data, e.g., based on decoding at least a part of the compressed audio file. The viseme may be scheduled to align with a corresponding phoneme. In this example, an audio decoder such as an Opus decoder is distributed with the language learning application to decode the compressed audio files or the decoding step is performed at the server.

For example, with an audio library such as an Opus library, audio may either be fed to client hardware (e.g., a push model) or requested (e.g., a pull model) by the client hardware. In both cases, a small section of the compressed audio file or Opus file, e.g., between 10-100 ms depending on the hardware and/or acceptable latency for the applied use, may be decoded. The small section may be referred to as an audio "buffer" or a decoder audio buffer, and the resulting raw PCM data may be transmitted to the client hardware. The size of the small section of compressed audio file or the buffer may determine how many times per second the compressed audio file is entailed being decoded, and/or may influence a latency between decoding the compressed audio file and a user hearing the result. Knowing the latency may be beneficial for offsetting the viseme timings. As the compressed audio file of each buffer is decoded, it may be known how many milliseconds into the compressed audio file the current progress is, and/or where visemes occur (e.g., from the encoding stage). And since the latency between transferring the audio buffer to the client hardware and it being heard may be known, while the raw audio data is generated, visemes for the future may be scheduled. For example, a 100 ms buffer may generate a viseme corresponding to that 100 ms of time taking the 100 ms buffer latency into account, depending on whether and how the push or pull model schedules its playback. These visemes may eventually drive the mouth shapes or facial expressions, e.g., of talking characters in the language learning application.

Figure 9:
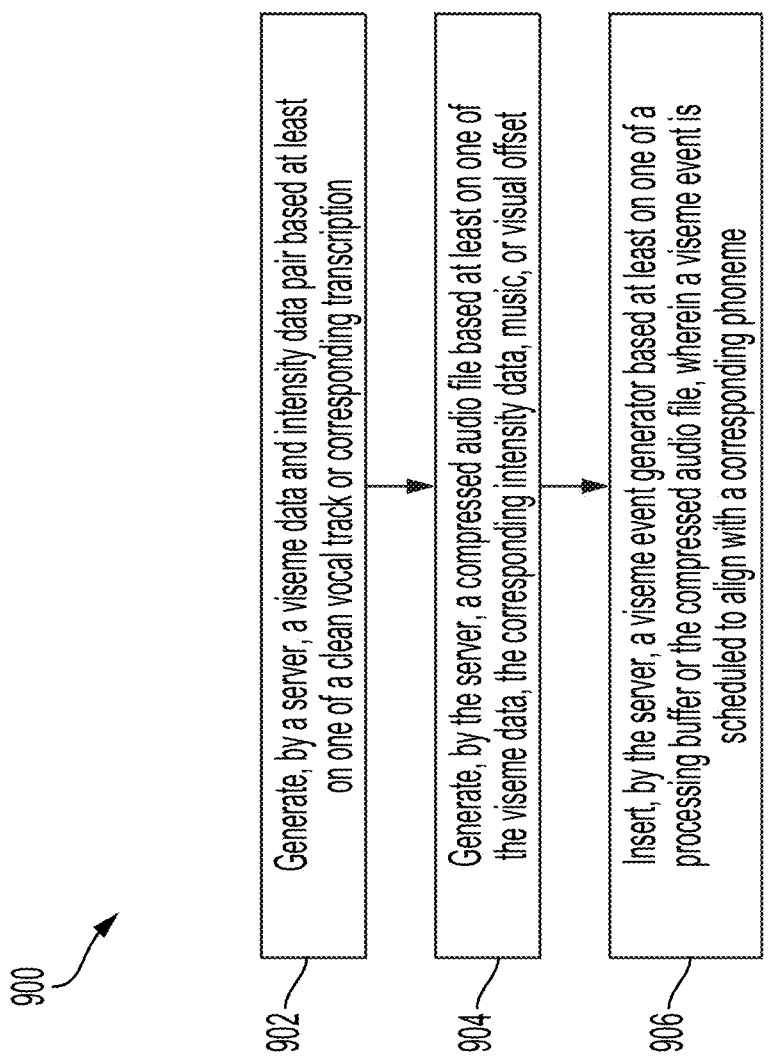
FIG. 9 is a flowchart of another method for generating a viseme corresponding intensity pair, according to one implementation of this disclosure.

With reference to FIG. 9, another example method 900 for generating a viseme and corresponding intensity pair is provided. Similar to the method 800, the method 900 may be used in the language learning application, e.g., implemented by the computer system 150 or the computing system 200 such as a server or a user equipment (UE). The method 900 may begin with an encoding step 902 by generating a viseme and intensity pair based at least on one of a clean vocal track or corresponding transcription. The method may include a step 904 for generating a compressed audio file based at least on one of the viseme data, the corresponding intensity data, music, or visual offset.

The method 900 may further include a step 906 for inserting a viseme generator based at least on one of a processing buffer or the compressed audio file. The viseme may be scheduled to align with a corresponding phoneme. In this example, a platform's own decoder is utilized to decode the compressed audio files.

In this example where a third party software or hardware codec is utilized, a viseme generator may be inserted into what's known as a "processing" stage, e.g., into a point in an audio lifecycle where effects such as equalization and/or reverb may occur. Instead of applying an effect, the audio may be passed through intact and a processing buffer may be used as a reference for viseme timings similar to the decoder audio buffer discussed above. The visemes may be generated based on this processing buffer's size in a similar way as described above with the decoder audio buffer.

In yet another example, the target platform or client hardware may support the Opus codec but not the container such as the Ogg "container" in which the compressed audio file is stored. For example, other hardware typically supports Opus but may entail the data being stored in a core audio format (CAF) container. In this case, the Opus "packets" may be extracted from the Ogg container and losslessly reassembled in a compatible CAF container, allowing the supplied codec to be used which may include features with hardware optimization purposes.

The step of scheduling a viseme to coincide with a corresponding phoneme may be referred to as a "lip-sync driver." The visemes from the decoder above may be scheduled to coincide at the point when the user will hear the sounds, and this may be used to drive either a "morph target" and/or another animation engine feature to show the expected viseme, mouth shape, or facial expression. Technically at the point the user hears the sounds, the mouth may already be in the expected position, which is achieved with the encoder stage offset. The visemes may be blended smoothly over time from one to the next, so the lips may naturally transition from one form to the next.

In one example, a method for generating a viseme and corresponding intensity pair includes generating a viseme and intensity pair based at least on one of a clean vocal track or corresponding transcription, and generating a compressed audio file based at least on one of the viseme, the corresponding intensity, music, or visual offset. The method further includes generating a buffer of raw pulse-code modulated (PCM) data based on decoding at least a part of the compressed audio file, where the viseme is scheduled to align with a corresponding phoneme.

In another example, a method for generating a viseme and corresponding intensity pair includes generating a viseme and intensity pair based at least on one of a clean vocal track or corresponding transcription, and generating a compressed audio file based at least on one of the viseme, the corresponding intensity, music, or visual offset. The method further includes inserting a viseme generator based at least on one of a processing buffer or the compressed audio file, and the viseme is scheduled to align with a corresponding phoneme.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the disclosure may also be embodied in a software program for storage in a suitable storage medium and execution by a processing unit.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

What is claimed is:

1. A method for generating a viseme and corresponding intensity pair, comprising:
    generating, by a server, a viseme and corresponding intensity pair based at least on one of a clean vocal track or corresponding transcription;
    generating, by the server, a compressed audio file based at least on one of the viseme, the corresponding intensity, music, or visual offset; and
    generating, by the server or a client end application, a buffer of raw pulse-code modulated (PCM) data based on decoding at least a part of the compressed audio file,
    wherein the viseme is scheduled to align with a corresponding phoneme, and scheduled to coincide when a user hears a sound to allow two or more mouth shapes or facial expressions to be in an expected position using at least one visual offset, the at least one visual offset being used to compensate for longer blending between the two or more mouth shapes, and wherein the scheduling is based at least on one of:
        a size of a decoder audio buffer for the compressed audio file,
        a size of a processing buffer, or
        a latency between transferring the decoder audio buffer to the client end application and the sound being heard.

2. The method of claim 1 further comprising storing the viseme and corresponding intensity pair in an intermediary file.

3. The method of claim 2, wherein the viseme and corresponding intensity pair is stored in the intermediary file with specific timings for the viseme and corresponding intensity.

4. The method of claim 1, wherein the frequency of decoding the compressed audio file is based on the size of the audio buffer.

5. The method of claim 1 further comprising feeding, by the server, the PCM data to a user equipment.

6. The method of claim 1 further comprising transmitting, by the server, the PCM data to a user equipment upon request.

7. The method of claim 1 further comprising scheduling the phoneme to align with at least one of a corresponding mouth shape or facial expression of an animated character.

8. A method for generating a viseme event and corresponding intensity pair, comprising:
    generating, by a server, a viseme and corresponding intensity pair based at least on one of a clean vocal track or corresponding transcription;
    generating, by the server, a compressed audio file based at least on one of the viseme, the corresponding intensity, music, or visual offset; and inserting, by the server, a viseme generator based at least on one of a processing buffer or the compressed audio file,
wherein the viseme is scheduled to align with a corresponding phoneme, and scheduled to coincide when a user hears a sound to allow two or more mouth shapes or facial expressions to be in an expected position using at least one visual offset, the at least one visual offset being used to compensate for longer blending between the two or more mouth shapes, and wherein the scheduling is based at least on one of:
a size of a decoder audio buffer for the compressed audio file,
a size of the processing buffer, or
a latency between transferring the decoder audio buffer to a client end application and the sound being heard.

9. The method of claim 8, wherein the scheduling of the viseme is based on the size of the processing buffer.

10. The method of claim 8 further comprising scheduling the phoneme to align with at least one of a corresponding mouth shape or facial expression of an animated character.

11. The method of claim 10, wherein the corresponding mouth shape or facial expression of the animated character is created based on the viseme.

12. The method of claim 8, wherein the frequency of decoding the compressed audio file is based on the size of the processing buffer.

13. The method of claim 8 further comprising feeding, by the server, the compressed audio file to a user equipment.

14. The method of claim 8 further comprising transmitting, by the server, the compressed audio file to a user equipment upon request.

15. A system for generating a viseme event and corresponding intensity pair, comprising:
a processor; and
a non-transitory computer readable storage medium storing programming for execution by the processor, the programming including instructions to:
generate a viseme and corresponding intensity pair based at least on one of a clean vocal track or corresponding transcription;
generate a compressed audio file based at least on one of the viseme, the corresponding intensity, music, or visual offset; and
generate a buffer of raw pulse-code modulated (PCM) data based on decoding at least a part of the compressed audio file,
wherein the viseme is scheduled to align with a corresponding phoneme, and scheduled to coincide when a user hears a sound to allow two or more mouth shapes or facial expressions to be in an expected position using at least one visual offset, the at least one visual offset being used to compensate for longer blending between the two or more mouth shapes, and wherein the scheduling is based at least on one of:
a size of a decoder audio buffer for the compressed audio file,
a size of a processing buffer, or
a latency between transferring the decoder audio buffer to a client end application and the sound being heard.

16. The system of claim 15, wherein the programming includes further instructions to store the viseme and corresponding intensity pair in an intermediary file.

17. The system of claim 16, wherein the viseme and corresponding intensity pair is stored in the intermediary file with specific timings for the viseme and intensity.

18. The system of claim 15, wherein the frequency of decoding the compressed audio file is based on the size of the audio buffer.

19. The system of claim 15, wherein the programming includes further instructions to feed the PCM data to a user equipment.

20. The system of claim 15, wherein the programming includes further instructions to transmit the PCM data to a user equipment upon request.

* * * * *